United States Patent [19]

Lehmann

[11] Patent Number: 5,435,543
[45] Date of Patent: Jul. 25, 1995

[54] MOTION INDICATING DEVICE FOR MOVING OBJECTS

[75] Inventor: Werner Lehmann, Gutach, Germany

[73] Assignee: Mathias Bauerle GmbH, St. Georgen/Schw, Germany

[21] Appl. No.: 185,693

[22] Filed: Jan. 24, 1994

[30] Foreign Application Priority Data

Jan. 23, 1993 [DE] Germany .................. 9300919 U

[51] Int. Cl.⁶ .............................................. B65H 7/02
[52] U.S. Cl. ........................... 271/258.04; 271/265.04; 340/674; 340/675; 250/559.26; 356/429; 226/100
[58] Field of Search ............. 271/258, 265; 340/674, 340/675; 250/559, 571; 356/429, 430; 226/100

[56] References Cited

U.S. PATENT DOCUMENTS

| 3,153,483 | 10/1964 | Simjian | 271/258 |
| 3,460,893 | 8/1969 | Wilks | 356/429 |
| 3,612,889 | 10/1971 | Diamond | 356/429 |
| 5,054,930 | 10/1991 | Adelson | 356/429 |

FOREIGN PATENT DOCUMENTS

| 964600 | 5/1957 | Germany | 271/258 |
| 0017748 | 1/1988 | Japan | 271/265 |

*Primary Examiner*—H. Grant Skaggs
*Attorney, Agent, or Firm*—McGlew and Tuttle

[57] ABSTRACT

A motion indicating device used especially to monitor the movement of sheets of paper, which are moved via conveyor paths. A scanning device has a rotatably mounted scanning member, which lies on the scannable surfaces of the moving sheet of paper and is set into rotation by same, and which is provided with signal elements, which generate motion signals in a stationary electronic signal transmitter by their rotary movements. The scanning member is a ball (8) with uneven weight distribution or a hollow ball (81, 82). The ball is guided freely rotatably in a guide cage (7) and has at least one signal element. A signal transmitter is arranged on a side located diametrically opposite the contact point (19) of the ball (8) and is directed in this plane of rotation toward the ball (8).

17 Claims, 7 Drawing Sheets

MOTION INDICATING DEVICE FOR MOVING OBJECTS

FIELD OF THE INVENTION

The present invention pertains to a motion indicating device for objects provided with a flat, mechanically scannable surface, which are moved via conveyor paths, especially sheets or webs of paper or textile fabric layers or textile webs, wherein a scanning device has a scanning member, which lies on the scannable surface of the moving objects, is set into rotation by it, and is provided with signal elements, which generate electronic motion signals in a stationary electronic signal transmitter due to their rotary movements.

BACKGROUND OF THE INVENTION

In prior-art motion indicating devices of this type, rotatably mounted rollers, wheels, or round disks are used as scanning members, and they lie, by their own weight and/or additionally spring-tensioned, in a frictionally engaged manner, on the flat surfaces of the moving objects, whose movement is to be monitored, and they are set into rotation by the moving objects at a circumferential velocity corresponding to the conveyor speed. The signal transmitters, which preferably operate in a contactless manner, may be inductive or consist of optoelectric units, e.g., light barriers. However, these prior-art scanning members require a fixed-position axis of rotation, which must be aligned, as accurately as possible, at right angles to the direction of movement of the objects in order for the scanning member not to be able to cause any change in direction. Consequently, their functionally correct installation is complicated and time-consuming. In addition, special adjusting devices, which entail additional costs, are necessary for this.

Paper jams, which may be caused by, e.g., nonuniform running of the machine, disturbances during folding, and/or damaged paper, may occur in paper-processing machines for sheets of paper, e.g., in folding machines, inserters, offset printers, or in paper-feeding devices.

When additional sheets of paper are introduced into the paper-guiding, -driving, and/or -processing rollers, these may be blocked, so that the entire roller mechanism of such a machine must be opened in order to remove these sheets. Such a paper jam may lead to a prolonged shutdown of the machine, unless the trouble is recognized in time.

The same problems occur in other machines as well, in which material webs are moved. These may be textile materials or even plastics in the form of webs or individual pieces, which are moved along a roller path or a conveyor belt.

SUMMARY AND OBJECTS OF THE INVENTION

The primary object of the present invention is to provide a motion indicating device of the type described in the introduction, which is of the smallest possible size, is compact, readily responds, and generates movement impulses, and whose scanning member adjusts itself automatically to any desired direction of movement of the objects to be monitored, without the signal-generating influence of its signal elements on the signal transmitter being functionally impaired.

This object is attained according to the present invention by the scanning element comprised of a ball of uneven weight distribution, which is freely rotatably guided in a guide cage and has at least one signal element, which is arranged in the plane of rotation of the greatest weight accumulation of the ball, and by the signal transmitter being arranged on the side diametrically opposed to the contact point of the ball and being directed radially toward the ball.

The scanning member, which is designed as a ball with uneven weight distribution, which is able to freely rotate in a guide cage, offers the decisive advantage that after a short warm-up time of a few seconds on a linearly moving substrate, it is aligned such that the area of the greatest weight rotates at the maximum distance around the axis of rotation, which is parallel to the path of movement, on the one hand, and it extends at right angles to the direction of movement, on the other hand, i.e., the ball rotates in the plane of its greatest weight accumulation. The center of the ball and the contact point, at which the ball touches the moving object, are inherently also located in this plane of rotation. Since the ball rapidly swings into this plane of rotation, a structural axis of rotation may be omitted. At the same time, the use of a guide cage, in which the ball is able to rotate in all directions, guarantees that the guided material, e.g., paper, will not be deflected from the direction of movement by the scanning member.

Another, even more advantageous solution to the task described is, according to the invention is the provision of the scanning member as a ball formed of a transparent material, especially plastic, in which a plurality of differently reflecting reflection surfaces are arranged as signal elements, which are joined together in an alternating sequence in all directions of rotations of the ball and reflect a light beam of a reflected light barrier directed toward the ball surface from the outside differently.

This second solution offers the advantage that in its simplest embodiment, the ball can be assembled by, e.g., bonding or welding, from two half shells, prepared according to the injection molding process, and that such a ball generates periodic impulse sequences in any desired direction of rotation, as long as it rotates. Alignment to a defined axis of rotation is not necessary.

The embodiment of the present invention wherein the weight accumulation is balanced in relation to the axis of rotation extending at right angles to the plane of rotation of the ball, is significant for achieving the most uniform and most correctly aligned rotary movement of the ball possible in the first solution according to the invention.

Embodiments concerning the uneven weight distribution, which are advantageous in terms of both manufacturing technology and function, include providing material inclusions or material embeddings wherein the material is denser than the density of the rest of the ball and providing radial depressions spaced at equal angular distances which depressions are filled with the material of higher density. The arrangement of the material inclusions or material embeddings in the center plane of the ball, i.e., in a plane passing through the center of the ball, offer the advantage that the material inclusions or material embeddings can also be used as signal elements at the same time.

Advantageous embodiments of the second solution include the use of both spherical, i.e., spherically arched reflection surfaces and metallized reflection surfaces.

Plane faces may remain non-metallized in the simplest and consequently most inexpensive embodiment. Relatively easy-to-prepare casting molds may be obtained for the two half shells of the ball, and it is guaranteed at the same time that periodic impulse sequences, which lead to a reliable control function, are generated during any desired direction of rotation of the ball.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENT

Figure 1:
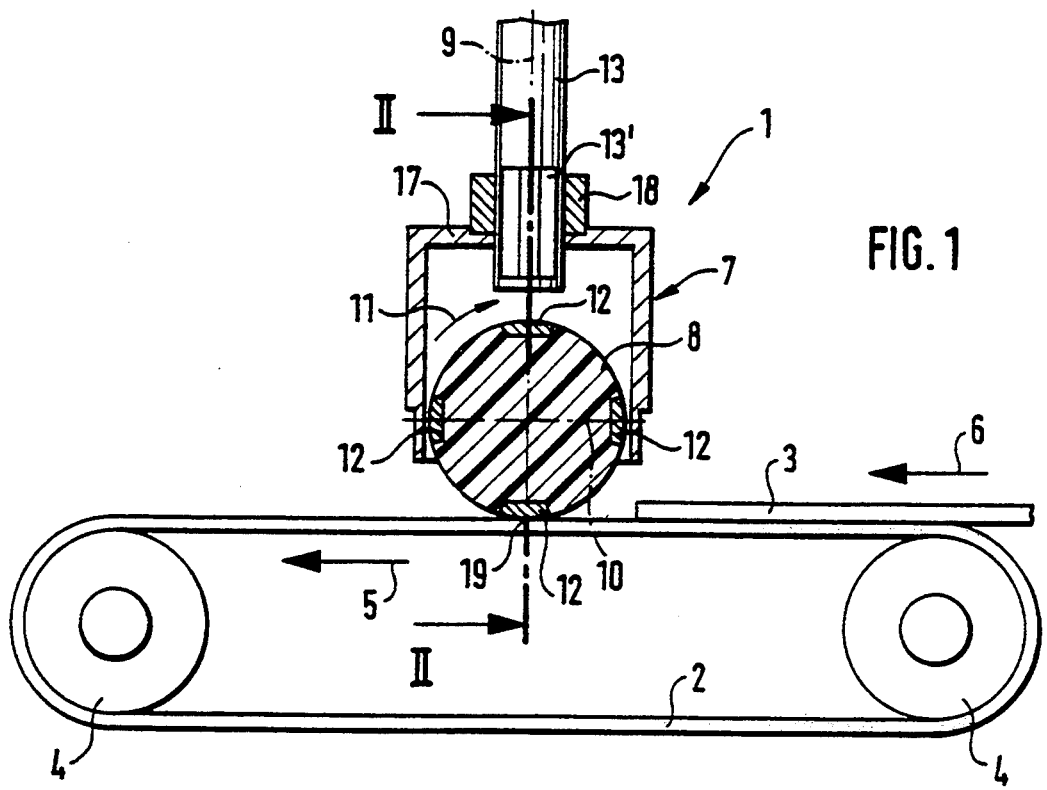
FIG. 1 is a sectional side view of a scanning device.
Figure 2:
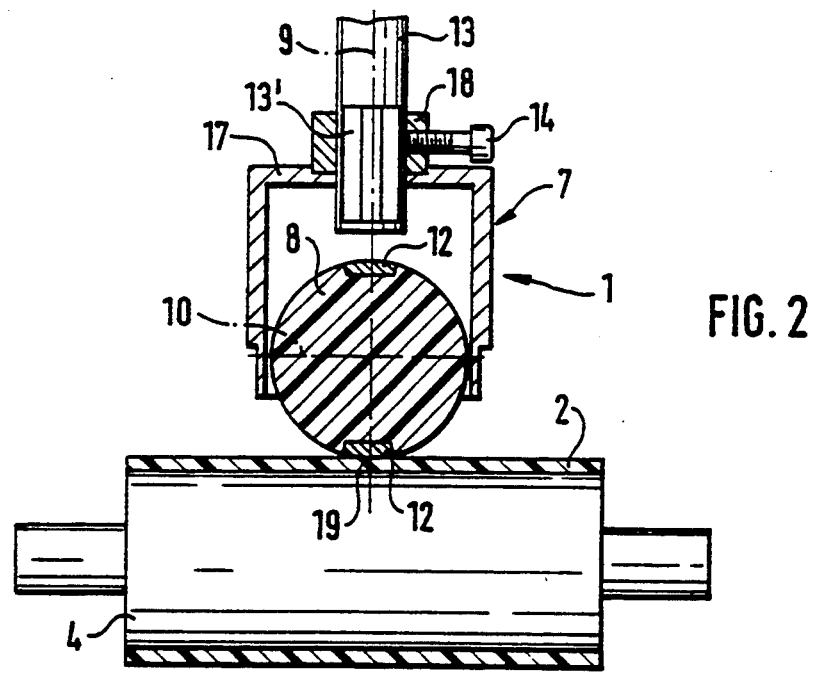
FIG. 2 is a section II—II from FIG. 1.
Figure 3:
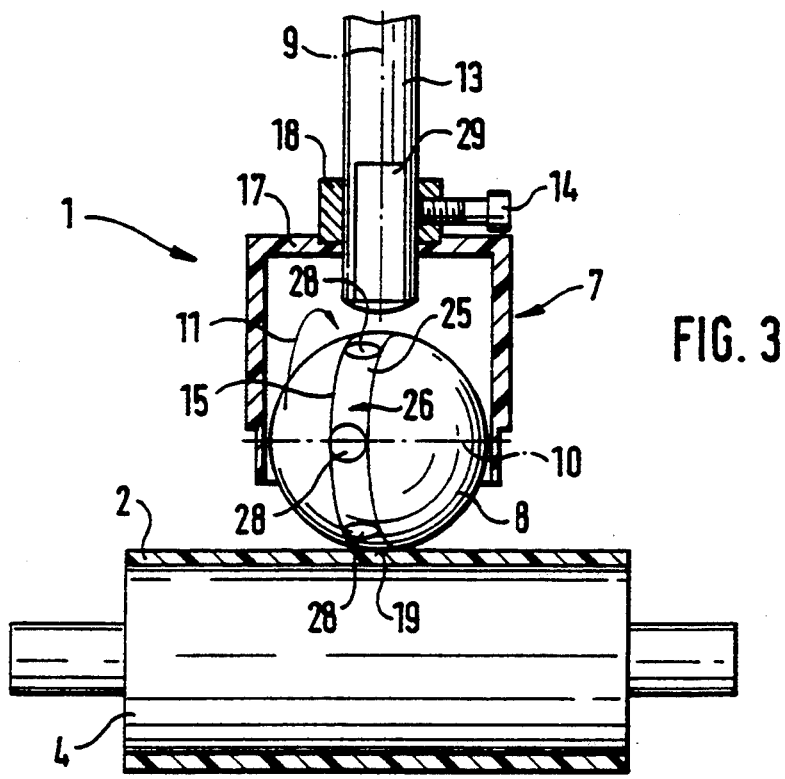
FIG. 3 is the representation according to FIG. 2 with the ball not in section.

The scanning device represented in FIGS. 1 through 3 has as the scanning member a ball 8, which is in loose, but frictionally engaged contact with a conveyor belt 2 under its own weight in the example in FIG. 1. The conveyor belt 2 is tensioned via two rollers 4. It is driven at a usually uniform transport speed in the direction of arrow 5, and is used to linearly move objects 3 in the direction of the arrow 6, i.e., the objects are correspondingly pushed through by the conveyor belt 2 under the scanning member in contact with it, i.e., under the ball 8, in order to set the ball into rotation.

The objects 3 may be sheets of paper, paper webs, textile materials, or even plastics in the form of webs or individual pieces.

The scanning device 1 arranged above the conveyor belt 2 is provided with a stationary, cylindrical or square guide cage 7, in which the ball 8 is guided such that it is able to lie on the conveyor belt 2 or on the objects 3 passing on it in a frictionally engaged manner, on the one hand, and to freely rotate, driven by them, on the other hand. It is able to move freely especially in the vertical plane along the axis 9 when it slides from the conveyor belt 2 onto, e.g., a sheet of paper 3 having a certain thickness.

The ball 8 will then rotate essentially around the axis of rotation 10, which becomes established automatically, corresponding to the direction of movement 5 of the conveyor belt 2 in the horizontal plane, corresponding to the direction of rotation 11.

As will be explained in greater detail below, the function of the scanning device 1 is independent from the direction of transport or from the direction of rotation 11 of the ball 8, so that the transport of paper can be monitored in any desired direction.

To make it possible to use a single, stationary signal transmitter 13, which detects the direction of rotation of the ball 8, the ball 8 is designed with uneven weight distribution, such that a plurality, preferably four, of material embeddings 12 are embedded concentrically, preferably near the circumference, in depressions 12' of the surface of the ball 8 in a radial or center plane of the ball 8 or symmetrically thereto. A radial or center plane is defined as a plane passing through the center of the ball 8.

The material of the embeddings 12 has a higher density than the material of the ball 8, which consists of, e.g., polyamide. As a result, there is an area of greater weight accumulation in the radial plane, which coincides with the plane of the drawing in FIG. 1 and FIG. 2, and the individual material embeddings 12 are located at a maximum distance from the center of the ball. This uneven weight distribution within the ball 8 causes the ball 8 to become aligned on the moving conveyor belt 2 or on the object 3, already after a short warm-up time, such that the area of the greatest weight accumulation will rotate at tile maximum distance around the axis of rotation 10, which extends exactly at right angles to tile radial plane, in which the material embeddings 12 of higher density are located.

It is important for the arrangement of the material embeddings 12 not to have any balance error to ensure that the ball 8 can be set into rotation as readily and uniformly as possible.

Since the ball 8 rapidly swings itself into the axis of rotation 10, no structural central axis is needed. What is important is only for the ball 8 to be guided horizontally readily rotatably in all directions, which can be achieved with the guide cage 7 or a stationary ring. The freely rotatable mounting of the ball 8 offers the advantage that the guided objects 3 are not deflected from their the direction of movement 6 by the ball 8.

Instead of or in addition to the material embeddings 12 enclosed in the surface of the ball, it would also be possible to provide material inclusions of greater weight, which are not visible on the surface of the ball, to bring about the uneven weight distribution.

The material embeddings 12 may be designed as signal elements and consist of ferromagnetic material, but advantageously of permanent magnets, which are able to generate motion signals in an induction coil 13' arranged in a signal transmitter 13. The signal transmitter 13 is arranged in the upper front wall 17 of the guide cage 7 by means of a sleeve 18 and a fastening screw 14 such that its the axis 9 extends through both the center of the ball and the contact point 19 of the ball 8 on the conveyor belt or of the object 3. This ensures that the material embeddings 12 move past the signal transmitter 13 at a very short distance, i.e., with the highest efficiency, and transmit the desired motion signals in the form of voltage impulses, in any direction of rotation of the ball 8.

When the motion signals in such a signal transmitter fail to appear while the machine is running, this means that the ball 8 lies on a stationary object, and that a jam or disturbance in movement occurs at this point. A shut-off signal for the processing machine can be generated with prior-art electronic means when the motion signals fail to appear.

The distance between the signal transmitter 13 and the ball 8 can be adjusted by means of the fastening screw 14.

It is also possible to use optoelectric signal generation instead of induction signal generation. To do so, optically scannable signal elements in the form of surface sections, whose reflectance differs from that of the rest of the surface of the ball 8, are to be provided on the ball surface in the radial plane of the greatest weight distribution. This can be achieved by, e.g., the material embeddings 12 being provided with an optically distinguishable surface, or by additionally applying spots which absorb light or which reflect light more strongly and can be scanned by a reflected light barrier 29. The signal transmitter 13 is now equipped with such a the reflected light barrier 29 directed toward the ball 8 (FIG. 3), which is directed toward the ball surface in the radial plane located in the axis 9.

FIG. 3 shows a scanning device 1, in which the front view of the ball 8 is represented, and the ball is provided with a circumferential groove 15, which is located in the radial plane extending at right angles to the axis of rotation, and is filled with a material 26, whose density is higher than the density of the material of the rest of the ball 8, to ensure uneven weight distribution.

The material 26 embedded in the circumferential groove 15 is provided on its annular surface, which forms part of the surface of the ball, with a plurality of circular, optically scannable spots 28, which are suitable for generating motion signals in a the reflected light barrier 29 in the above-described manner. This arrangement of the material 26 in the circumferential groove 15 also ensures that the ball 8 will rotate around a the axis of rotation 10 that extends exactly at right angles to the radial plane, in which the circumferential groove 15 is located.

Figure 4:
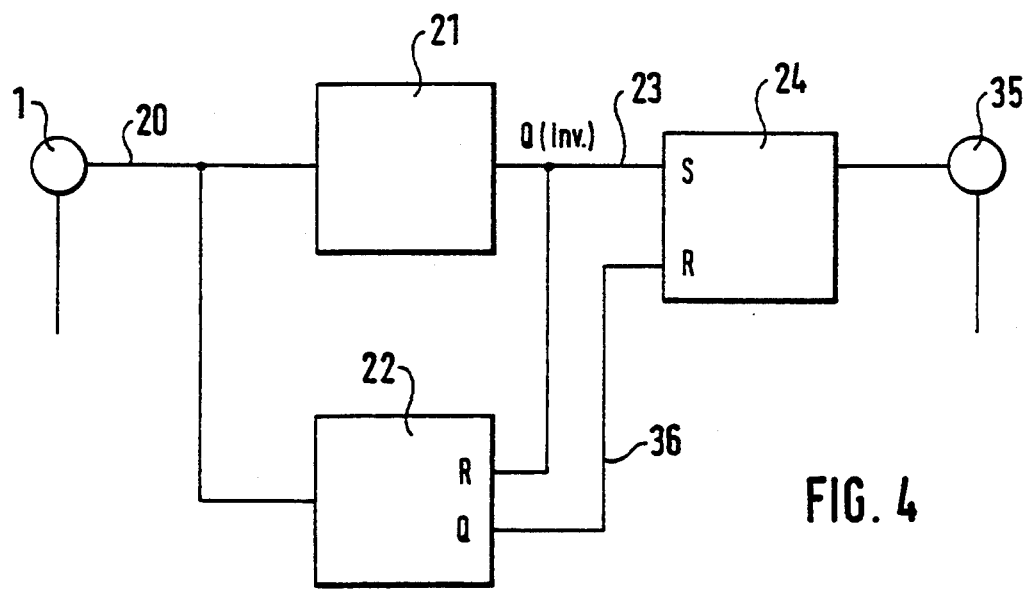
FIG. 4 is a block diagram of an electronic control circuit according to the invention.
Figure 5:
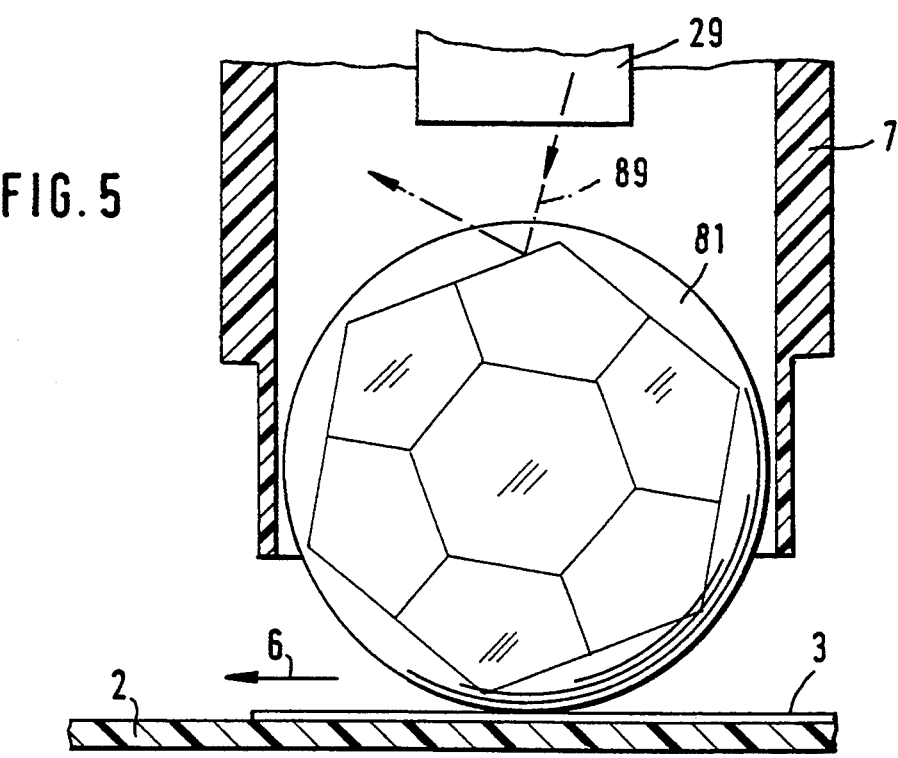
FIG. 5 is a scanning device with another ball as the scanning member.

FIG. 4 shows a block diagram of an electronic control circuit of the scanning device 1 with the signal transmitter 13. The scanning device 1 sends motion signals 20 at a frequency that is determined by the number of the signal elements 12, 28 used and the speed of the conveyor belt or of the objects 3 moving past. The objects 3 moving regularly and uniformly lead to a defined, relatively high cycle frequency of the motion signals 20. These are sent to a monostable Flip-Flop 21 and a counter 22.

When the machine is switched on, the inverted output 23 of the retriggerable monostable Flip-Flop 21 has a one-level, so that the RS-Flip-Flop 24 following it shows an error signal on its output 35. The transport of the objects 3 then begins. The counter 22 counts a predeterminable number of cycle signals, e.g., 8 signals, and then resets the Flip-Flop 24 via its output 36, so that the error signal will disappear. Due to the cycle signals 20 now arriving regularly, the inverted output 23 of the retriggerable Flip-Flop 21 returns to zero level, and the output 35 of the RS-Flip-Flop 24 following it generates no error signal.

When the transport of a the object 3 just scanned stalls or stops completely, the pulse-like motion signals 20 become irregular or disappear altogether. As a result, the inverted output 23 of the retriggerable monostable Flip-Flop 21 passes over to a one-level after a short time, and the output 35 of the RS-Flip-Flop 24 following it generates an error signal. At the same time, the inverted output 23 of the monostable Flip-Flop 21 is applied to the reset input of the counter 22, so that the latter is set at zero and is unable to generate any reset pulse. The short time period corresponds to the set time period of the monostable Flip-Flop 21, and this period is selected to be such that during regular paper feed, the next zero-one signal generated by the signal elements 12, 28 enters the evaluating circuit according to FIG. 4 within the time period set. Besides the control circuit shown in FIG. 4, it is also possible to use other evaluating circuits, e.g., the connection of two monostable Flip-Flops, wherein the counter 22 is replaced with another monostable Flip-Flop, which is driven by the monostable Flip-Flop 21, and thus resets the RS-Flip-Flop 24 after a predetermined start-up time.

Only different balls, namely, hollow balls 81 or 82, are provided as the scanning members in the embodiments according to FIGS. 5 through 11. The reflected light barrier 29 and the corresponding control circuit according to FIG. 4 can also be used with the hollow balls 81 or 82, in principle, in the same manner, but possibly in a somewhat modified manner. Both the hollow balls 81 and 82 consist of two respective half shells 81' and 82' of equal shape, which are made of a transparent, preferably clear plastic or glass, which are assembled by bonding or welding and form a hollow ball 81 or 82 each when assembled.

The hollow ball 81 represented in FIGS. 5 through 8 has an inner surface, which consists completely of plane faces 83 and 84 arranged next to each other without gaps in all circumferential directions. The plane faces 83 are in the form of identical, regular, i.e., equilateral, hexagons, all of which can be used as optical reflection surfaces. These polygonal plane faces are arranged in the manner of polyhedra in relation to one another. A total of twelve pentagonal and eight hexagonal plane faces, which define the hollow space 85 of the hollow ball 81, are provided in the exemplary embodiment shown. The corners 86 of all the plane faces 83 and 84 are located on an enveloping sphere 87, which is represented by phantom lines in the drawing, but which does not practically appear. It can also be recognized from the drawing that respective adjacent plane faces 83, 84 have a common limiting edge 88. There are also other types of polyhedra, e.g., an octahedron with eight equilateral triangular surfaces, a pentagon-dodecahedron with twelve equilateral pentagonal surfaces, or an icosahedron with twenty equilateral triangular surfaces.

The plane faces 83 and 84 are used as reflection surfaces for a light beam 89 of a the reflected light barrier 29 directed toward the ball surface from the outside. During the rotary movement of the hollow ball 81, the light beam 89 is reflected by the plane faces 83, 84 in alternating directions, such that it periodically falls on the receiver of the reflected light barrier 29 in the case of constant speed of rotation and direction of rotation of the hollow ball 81, and causes it to generate a periodic sequence of the motion signals 20. The motion signals 20 are evaluated in the above-described manner by the electronic control circuit represented in FIG. 4.

Figure 6:
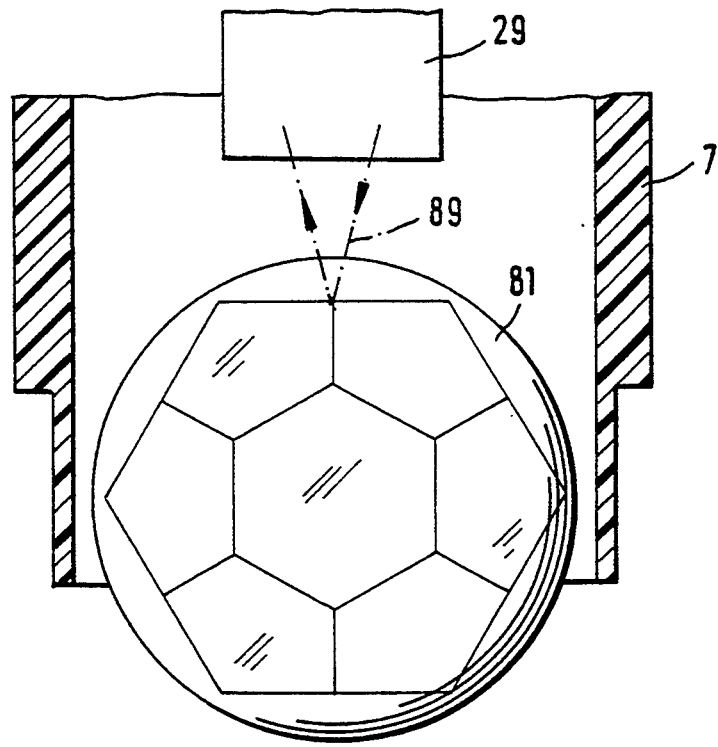
FIG. 6 is the scanning device according to FIG. 5 showing another position of rotation of the ball.
Figure 7:
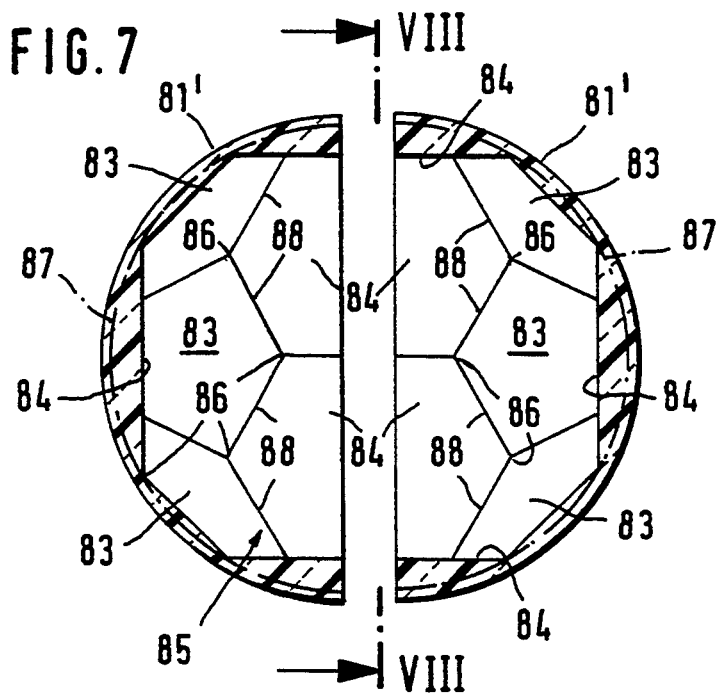
FIG. 7 is a sectional view showing two half shells of a ball, which can be assembled to a hollow ball, in the sectional representation VII—VII from FIG. 8.
Figure 8:
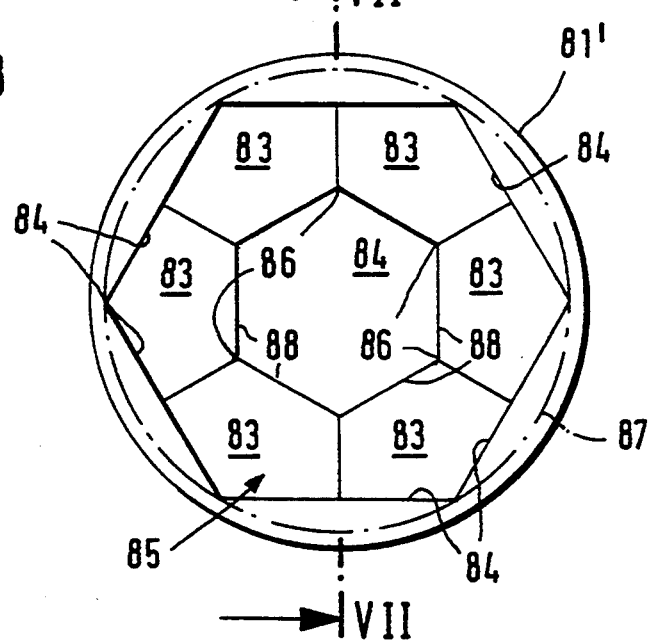
FIG. 8 is a view of the half shell of the ball in the view VIII—VIII according to FIG. 7.

It is ensured by the above-described arrangement of the plane faces 83, 84 used as reflection surfaces that motion signals are regularly generated in the reflected light barrier regardless of the direction of rotation of the hollow ball 81 used as the scanning member, because the state of reflection shown in FIG. 6, in which the light beam 89 is reflected at least briefly to the receiver of the reflected light barrier 29, occurs at least twice during each revolution of the ball, since two of the identical plane faces 83 and 84 are always located diametrically opposite each other in parallel position.

Figure 9:
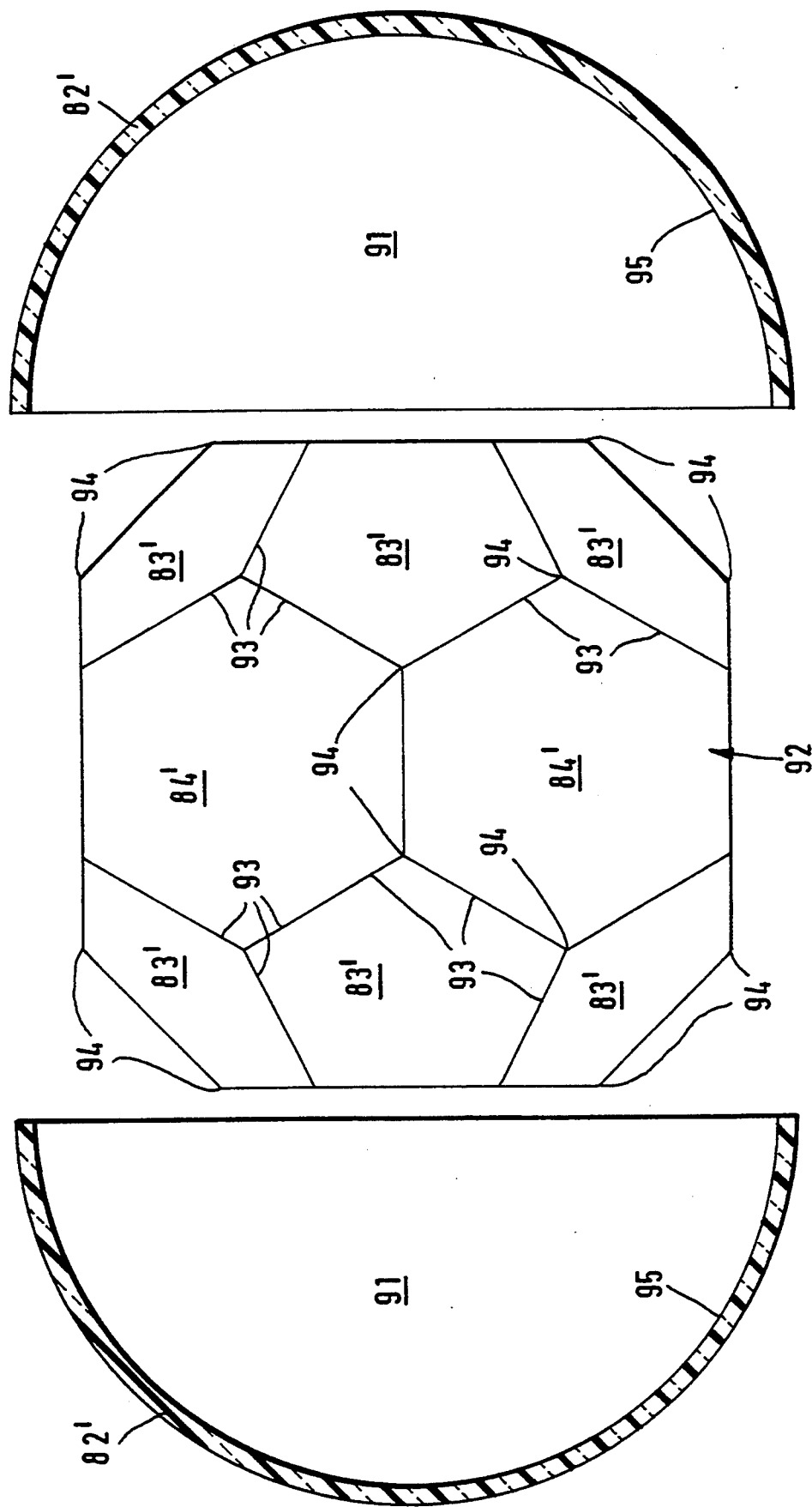
FIG. 9 is a partial sectional view of the individual Parts of a ball consisting of two half shells and a filling body.
Figure 10:
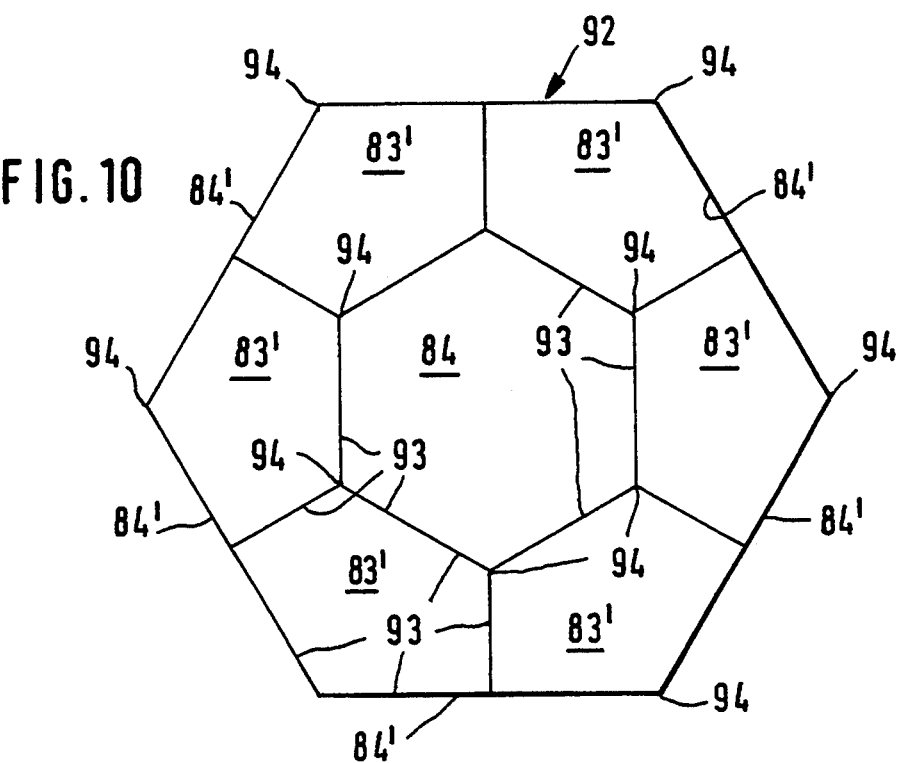
FIG. 10 is view of the filling body from FIG. 9 in view X from FIG. 9.
Figure 11:
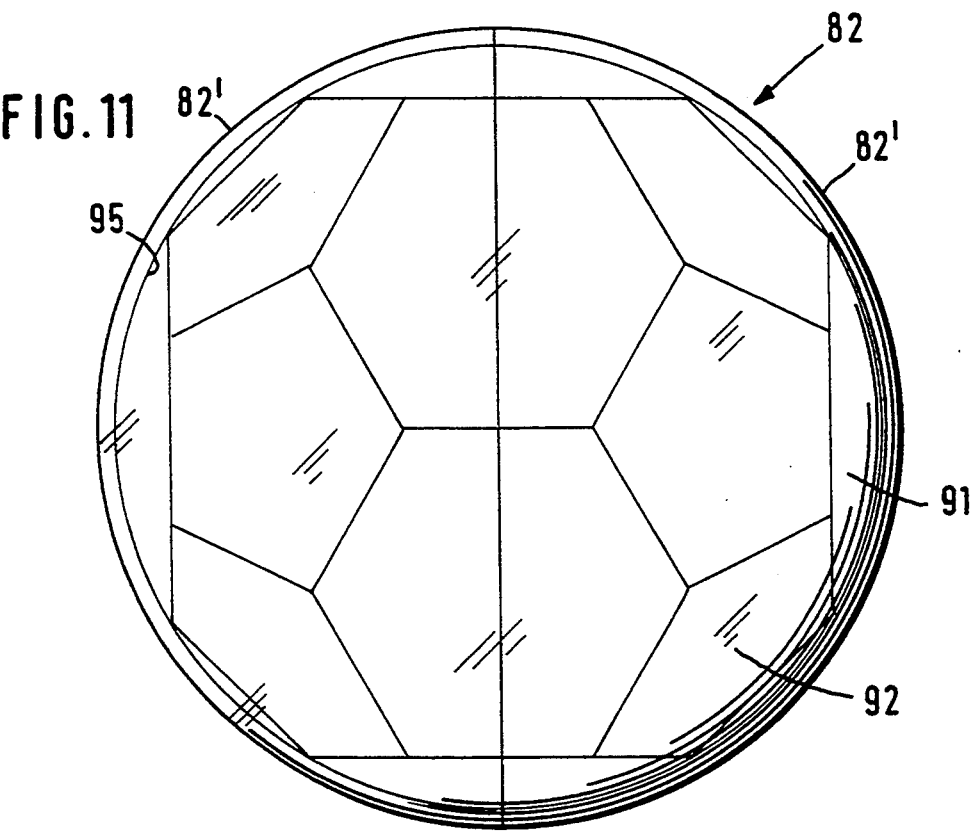
FIG. 11 is a side view of the ball assembled from the three individual parts according to FIG. 9.

The hollow ball 82 represented in FIGS. 9 through 11 consists of two transparent, preferably clear, ball half shells 82', which are of identical shape, are firmly assembled on their front side by bonding or welding, have the same wall thickness everywhere, and thus enclose a likewise spherical hollow space 91. A polyhedron, whose corners 94 are in contact with the spherical inner surface 95 of the closed hollow ball 82, and synchronously participate in each rotation of the hollow ball 82, is inserted into the hollow space 91. In the exemplary embodiment selected, the outer shape of the filling body 92 exactly corresponds to the inner shape of the hollow space 85 of the hollow ball 81. The filling body 92 is provided on the outside with twelve regular or equilateral pentagonal plane faces 83' and with eight equilateral hexagonal plane faces 84', all of which can be used as reflection surfaces for the light beam 89 of the reflected light barrier 29 in the same manner as the plane faces 83 and 84 of the hollow ball 81. These the plane faces 83' and 84' are also connected in pairs by a common limiting edge 93.

The only thing that is important is that the plane faces 83' and 84' be such that they are able to reflect a light beam in a defined manner. To achieve this, it is sufficient for them to be flat; their reflection surface is, of course, better if they are metallized. This also applies to the plane faces 83 and 84 of the hollow ball 81, which consist of inner surfaces. The filling body 92 may be formed of any solid material that makes possible the formation of a flat, reflecting surface.

Another possibility of forming signal elements or reflection surfaces in a hollow ball formed by the two ball half shells 82' in a simple manner is to provide the spherical inner surface 95 with reflecting and nonreflecting or nontransparent, spherical surface sections, which are arranged next to each other in an alternating manner in all circumferential directions. Such surface sections can also be used to generate the periodic motion impulses 20 in a the light barrier (29) analogously to the plane faces 83, 84 or 83', 84' described.

Figure 12:
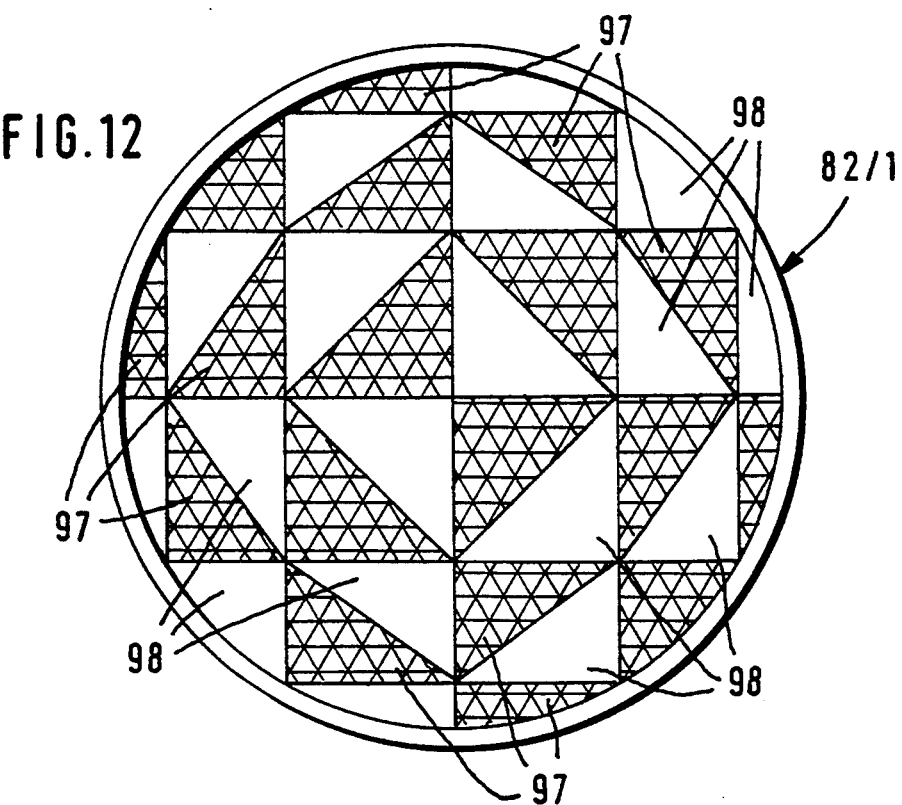
FIG. 12 is a front view of two open half shells of a ball with different spherical reflection surfaces on their inner surfaces.
Figure 13:
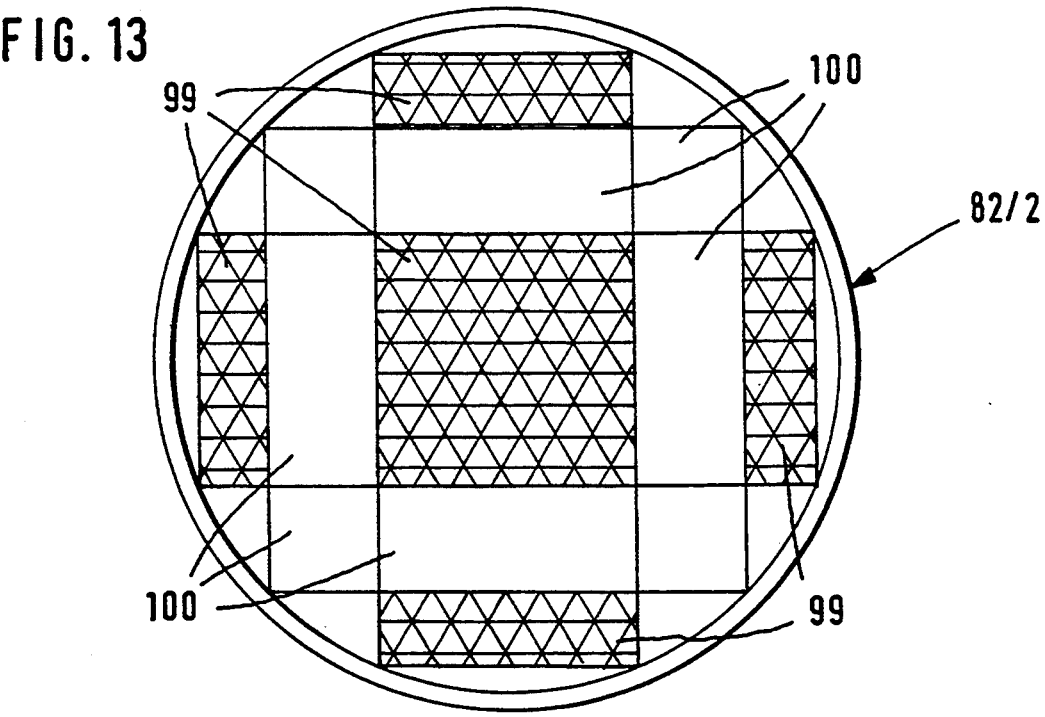
FIG. 13 is a view similar to FIG. 12 showing an additional possible variation.

FIGS. 12 and 13 show front views of two such half shells 82/1 and 82/2 consisting of a clear plastic. The inner surface of the half shell 82/1 is provided with a plurality of triangular surface sections 97 and 98, wherein the shaded surface sections 97 are metallized, and the non-shaded surface sections 98 are transparent to light or absorb light.

As an additional possibility of variation, FIG. 13 shows metallized surface sections 99 and transparent or light-absorbing surface sections in the shape of a square.

While specific embodiments of the invention have been shown and described in detail to illustrate the application of the principles of the invention, it will be understood that the invention may be embodied otherwise without departing from such principles.

What is claimed is:

1. Motion indicating device for objects which are moved on conveyor paths and are provided with a flat, mechanically scannable surface, such as sheets of paper, webs of textile fabric layers and fabric webs, the device comprising:

a ball scanning member;

a stationary guide cage, said ball being rotatable in all directions and vertically movable in said stationary guide cage;

signal transmitting elements arranged within an outer surface of said ball and extending over limited sections of said ball, said ball scanning member being formed of a ball with an uneven weight distribution, said ball being guided freely rotatably in said stationary guide cage and having at least one of said signal transmitting elements arranged in the plane of rotation of a greatest weight accumulation of said ball;

signal transmitter means for generating electronic motion signals due to movement of said signal transmitting elements upon rotary movement of said ball for generating motion signals, independently of a direction of movement of said scannable surface, said signal transmitter means being arranged on a side located diametrically opposite a contact point of said ball and being directed radially toward said ball in a plane of rotation.

2. Motion indicating device according to claim 1, wherein:

said uneven weight distribution is achieved by providing material inclusions or material embeddings, said material inclusions or material embeddings having a density higher than a density of the material of a remainder of said ball.

3. Motion indicating device according to claim 2, wherein:

said material having a density higher than a density of material forming a remainder of said ball is embedded in a circumferential groove of the ball.

4. Motion indicating device according to claim 3, wherein:

said circumference groove extends in a plane passing through the center of the ball.

5. Motion indicating device according to claim 2, wherein:

said material inclusions or material embeddings are ferromagnetic, said signal transmitter means includes an induction coil.

6. Motion indicating device according to claim 2, wherein:

said material inclusions or material embeddings form magnetic signal elements arranged in depressions of said ball, said signal transmitter means including an induction coil.

7. Motion indicating device according to claim 1, wherein:

said uneven weight distribution is achieved by providing a plurality of radial depressions in said ball, spaced at equal angular distances, said radial depressions being arranged in a plane passing through a center of said ball, said radial depressions being filled with a material having a density higher than a density of a remainder of said ball.

8. Motion indicating device according to claim 1, wherein:

said signal element is formed of sections of said ball having a reflectance which differs from a remainder of said surface of said ball, said signal transmitter including a reflected light barrier directed radially toward said ball.

9. Motion indicating device for objects which are moved on conveyor paths and are provided with a flat, mechanically scannable surface, such as sheets of paper, webs of textile fabric layers and fabric webs, the device comprising:
  a ball scanning member;
  a stationary guide cage, said ball being rotatable in all directions and vertically movable in said stationary guide cage;
  signal transmitting elements arranged within an outer surface of said ball and extending over limited sections of said ball, said ball scanning member being a hollow ball, formed of a transparent material in which a plurality of differently reflecting reflection surfaces are arranged as said signal transmitting elements, next to each other in an alternating sequence in all directions of rotation of the hollow ball;
  signal transmitter means for generating electronic motion signals due to movement of said signal transmitting elements upon rotary movement of said ball for generating motion signals, independently of a direction of movement of said scannable surface, said signal transmitter means having a light barrier generating a light beam, said signal transmitting elements reflecting said light beam, which is directed toward said ball surface from the outside differently.

10. Motion indicating device according to claim 9, wherein a non-metallized surface section is arranged between two metallized reflection surfaces of said signal transmitting elements.

11. Motion indicating device according to claim 8, wherein said metallized reflection surfaces are spherically arched.

12. Motion indicating device according to claim 9, wherein said reflection surfaces are plane faces of regular polygons.

13. Motion indicating device according to claim 10, wherein said plane faces are formed of a plurality of pentagons and hexagons, which are each connected to one another by a common limiting edge.

14. Motion indicating device according to claim 10, wherein all plane faces of said polygons are metallized to form a reflection surface.

15. Motion indicating device according to claim 9, said regular polygons form an inner surface of a hollow ball or an outer surface of a polyhedron-like filling body arranged in a hollow space of a hollow ball.

16. Motion indicating device according to claim 11, wherein said hollow space of said hollow ball is defined by a total of eight regular hexagons of equal size and by twelve regular pentagons, also of equal size among them.

17. Motion indicating device according to claim 11, wherein said hollow ball is formed of two half shells, which are firmly assembled.

* * * * *